(12) United States Patent
Tokuyama et al.

(10) Patent No.: US 6,594,104 B2
(45) Date of Patent: Jul. 15, 2003

(54) MAGNETIC DISK UNIT INCLUDING TEMPERATURE SENSING OF IC MOUNTED ON SUSPENSION

(75) Inventors: Mikio Tokuyama, Tsukuba (JP);
Toshihiko Shimizu, Yasato (JP);
Hiromitsu Masuda, Chiyoda (JP);
Shigeo Nakamura, Odawara (JP)

(73) Assignee: Hitachi, Ltd., Tokyo (JP)

( * ) Notice: Subject to any disclaimer, the term of this patent is extended or adjusted under 35 U.S.C. 154(b) by 312 days.

(21) Appl. No.: 09/791,555

(22) Filed: Feb. 26, 2001

(65) Prior Publication Data

US 2002/0118485 A1 Aug. 29, 2002

(51) Int. Cl.⁷ .................... G11B 5/596; G11B 21/02; G11B 19/04
(52) U.S. Cl. .................... 360/78.02; 360/75; 360/60; 360/77.07
(58) Field of Search .................... 360/64, 75, 78.04, 360/78.05, 78.12, 60, 77.02

(56) References Cited

U.S. PATENT DOCUMENTS

| | | | | |
|---|---|---|---|---|
| 4,814,908 A | * | 3/1989 | Schmitz | 360/77.02 |
| 6,160,676 A | * | 12/2000 | Takaishi | 360/78.05 |
| 6,282,038 B1 | * | 8/2001 | Bonaccio et al. | 360/46 |
| 2003/0002196 A1 | * | 1/2003 | Kusumoto et al. | 360/75 |

FOREIGN PATENT DOCUMENTS

JP         411096566 A     *  4/1999

\* cited by examiner

Primary Examiner—Andrew L. Sniezek
(74) Attorney, Agent, or Firm—Antonelli, Terry, Stout & Kraus, LLP (57) ABSTRACT

In the magnetic disk unit comprising suspensions in each of which an IC is mounted on a load beam, a magnetic head displacement caused by the warp of the load beam occurring due to heat generated from the IC is compensated, whereby the shortening of an access speed and high reliability of reading/writing are realized. The thermal displacement of the magnetic head is compensated by operating micro actuators on the load beam in accordance with the temperature rise of the IC which is measured by a temperature sensor. Namely, by driving the micro actuators so that the magnetic head may move in a direction reverse to the direction of the magnetic head movement caused by the thermal displacement, the thermal displacement of the magnetic head is made to be substantially zero.

13 Claims, 9 Drawing Sheets

PRIOR TO OPERATION OF MAGNETIC READ
(NO TEMPERSTURE RISE OF IC)

FIG.7B

DURING OPERATION OF MAGNETIC READ
(TEMPERATURE RISE OF IC)

FIG.7C

DISPLACEMENT COMPRENSATION OF MAGNETIC READ
BY MICRO-ACTUATOR

MAGNETIC DISK UNIT INCLUDING TEMPERATURE SENSING OF IC MOUNTED ON SUSPENSION

BACKGROUND OF THE INVENTION

The invention relates to a magnetic disk unit, and particularly relates to a magnetic disk unit having two types of actuators, that is, coarse actuators for large movement and micro actuators and further having a controlling IC on a suspension supporting a magnetic head.

As a prior art of the invention, JP-A-11-195215 discloses that, in a magnetic head-supporting mechanism having two-stage actuators and an IC (integrated circuit) mounted in a suspension, the mechanism is provided with means for preventing the IC itself from being damaged due to heat occurring during the operation of the IC. Further, regarding a conventional head-supporting mechanism of one stage, JP-A-4-103085 discloses a controlling method for compensating the position deviation of the head-supporting mechanism which deviation occurs due to temperature rise of a magnetic disk unit.

In a chip-on-suspension (hereinafter referred to as COS) in which an IC is mounted on a suspension, there is such a case as a magnetic head deviates in the direction of the radius of a disk due to the temperature rise of the IC.

In a magnetic disk unit having a plurality of magnetic heads mounted therein, there is such a case as, in a plurality of magnetic heads initially located in an identical cylinder, a certain magnetic head successively performs reading or writing, and in this case there occurs a phenomenon explained below. In the case where one magnetic head is successively operated, the IC of the magnetic head rises, so that a suspension is deformed with the result that the successively operated magnetic head and other magnetic heads (non-operated magnetic heads) deviate in the direction of the radius. The successively operated magnetic head is servo-controlled to thereby follow the identical cylinder. In this state, when magnetic-head-switching from the successively operated magnetic head to another magnetic head is performed, the magnetic head commencing the operation by the magnetic-head-switching comes to lose its location because the switched magnetic head is located in another cylinder different from that of the successively operated magnetic head. Thus, it is necessary for the switched magnetic head to seek in the direction of the radius so that location information recorded in a disk may be read out. Accordingly, since it is impossible to immediately perform the writing/reading of data, there is such a problem as the transfer speed decreases.

Further, in a case of writing servo information (location information) through STW (servo track writer), there is such another problem as tracks can not be written at an equal pitch due to the thermal deformation.

OBJECT AND SUMMARY OF THE INVENTION

The object of the invention is to obtain a magnetic disk unit having a plurality of suspensions in the same cylinder, in which magnetic disk unit, even at a time when reading/writing operation is transferred from the first suspension to the second suspension under a state that servo control is performed regarding the first suspension while a heating element such as IC is operated in the first suspension, it is possible for the transferred, second suspension to perform smooth operation.

According to the first aspect of the invention, there is provided a magnetic disk unit having micro actuators for slight movement and an IC for amplifying the reading/writing signals of a magnetic head which IC is mounted on a suspension, the magnetic disk unit comprising: a sensor for monitoring the temperature of the IC which is operating (, that is, during the reading/writing operation of the magnetic head); and means for compensating the location of the magnetic head of a suspension mounting the IC the temperature of which rises, in compliance with the temperature variation (temperature rise) by use of the micro actuators. In other words, the amount of displacement which occurs regarding the magnetic head due to the temperature rise of the IC is compensated by the micro actuators. This compensation is performed by a displacement amount corresponding to the temperature rise while sensing the temperature rise of the IC through the sensor. In this case, it is necessary to previously measure a relation between the temperature rise and the displacement amount, and by use of a table in which this relation is written, the compensation can be performed. Alternatively, the compensation table of the magnetic head relating to the temperature rise of the IC (, that is, the relation between the compensation amount of displacement of the magnetic head and the temperature rise) may be previously stored in the IC.

Further, in a case of successively writing information as in the case of the STW, the IC may be preheated prior to the writing of the information up to a temperature corresponding to that of the successive writing, and the preheating is ceased at the same time as the writing is commenced. By these, since the temperature of the IC is kept to be constant, it becomes possible to prevent the thermal displacement of the magnetic head from occurring due to the temperature rise caused with the elapse of time after the commencement of the writing, whereby it is possible to write servo information at an even track pitch. (Further, by keeping the temperature of the IC so that it may be the temperature of the successive writing or successive reading, the amount of the thermal displacement of the magnetic head can be kept to be constant. Thus, it becomes possible to prevent the thermal displacement of the magnetic head from occurring due to the temperature rise caused after the commencement of the writing or reading.)

Further, by providing controlling means for maintaining a predetermined temperature regarding the IC while detecting the temperature of the IC, it becomes possible to record servo information at an even track pitch from the inner periphery of a disk to the outer periphery thereof. Since the flow rate of air flow above the inner periphery of the disk differs from that above the outer periphery thereof, the temperature of the IC varies in a case of heating with the same amount of heat generation insofar as the inner and outer peripheries are concerned, so that there occur such a problem as no writing can be performed at an even track pitch. However, by providing the controlling means for making the IC temperature constant, the thermal displacement becomes constant between the inner and outer peripheries of the disk, whereby the servo information can be recorded at the even track pitch. Thus, the precision of positioning and the quality of reading/writing are enhanced, so that high recording density can be achieved.

DESCRIPTION OF THE EMBODIMENTS

The embodiments of the invention are described in detail below while referring to the drawings.

Figure 1:
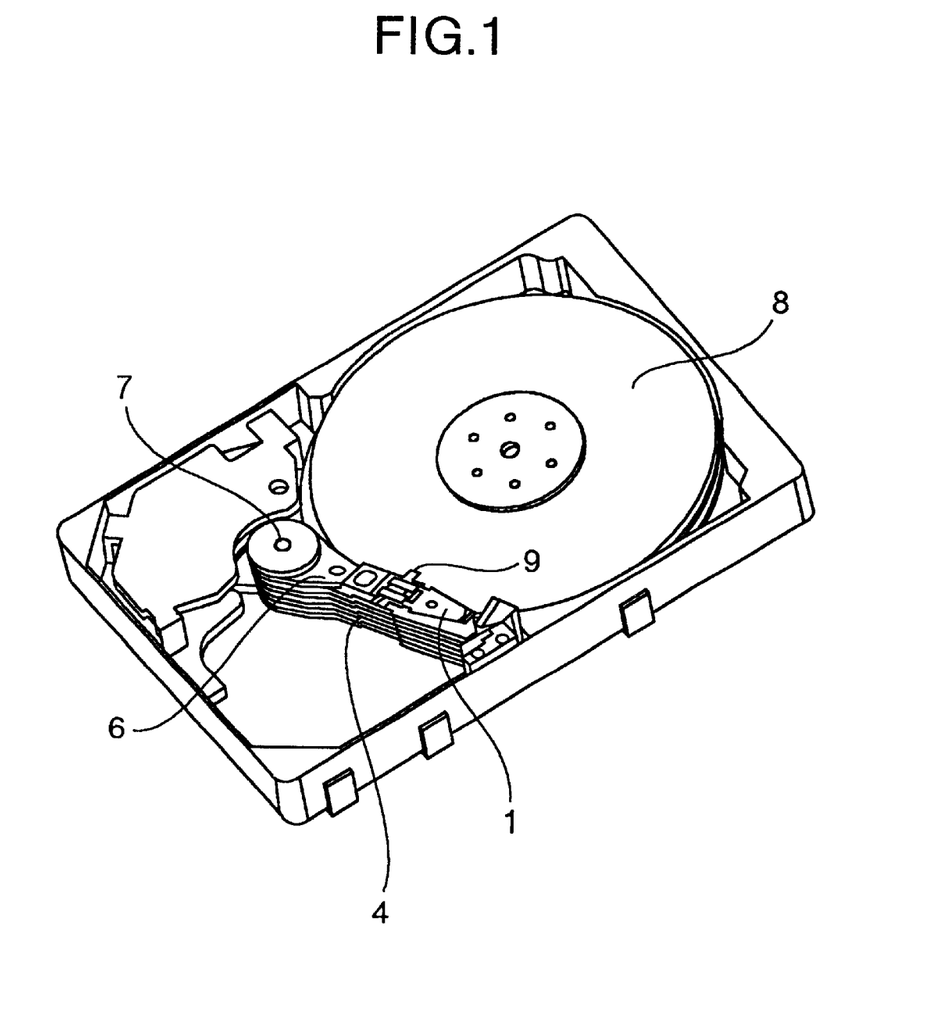
FIG. 1 is a perspective view of a magnetic disk unit of the first embodiment of the invention.
Figure 2:
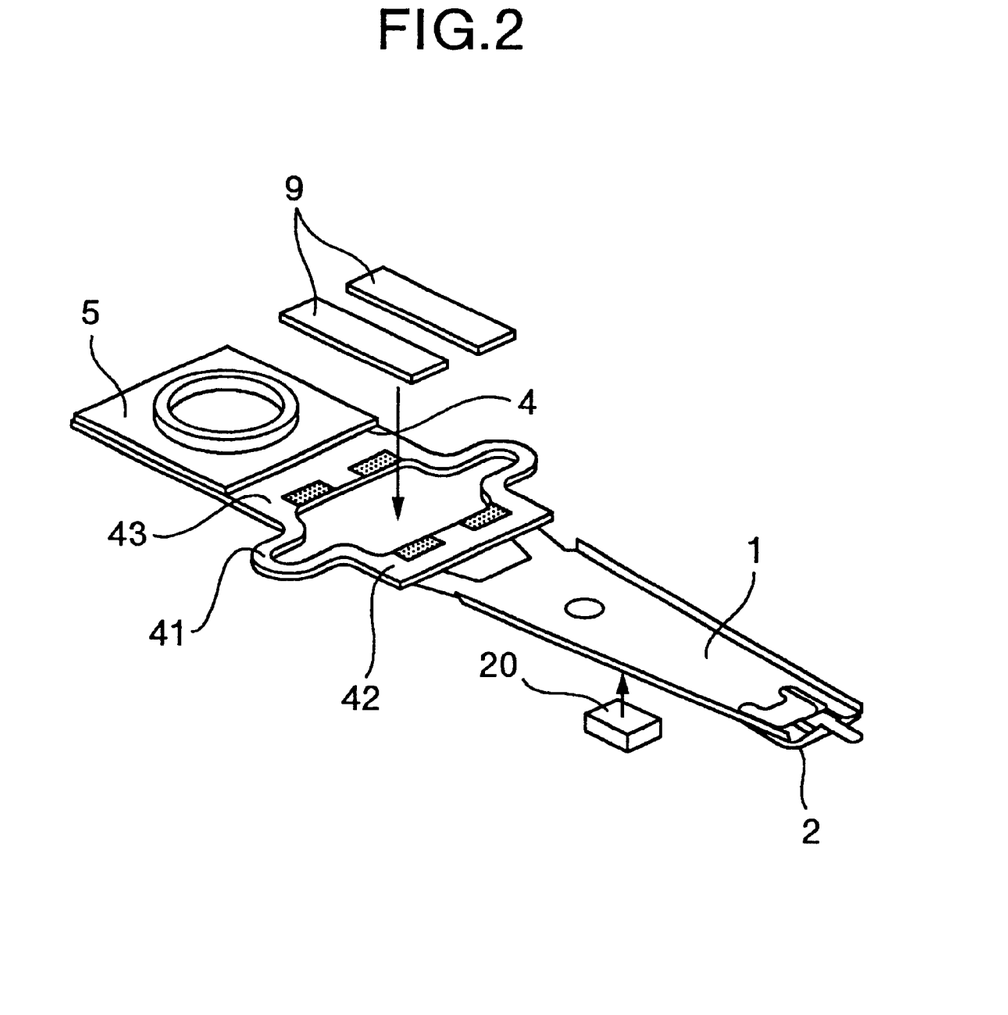
FIG. 2 is a perspective view of a suspension used in the first embodiment.
Figure 3:
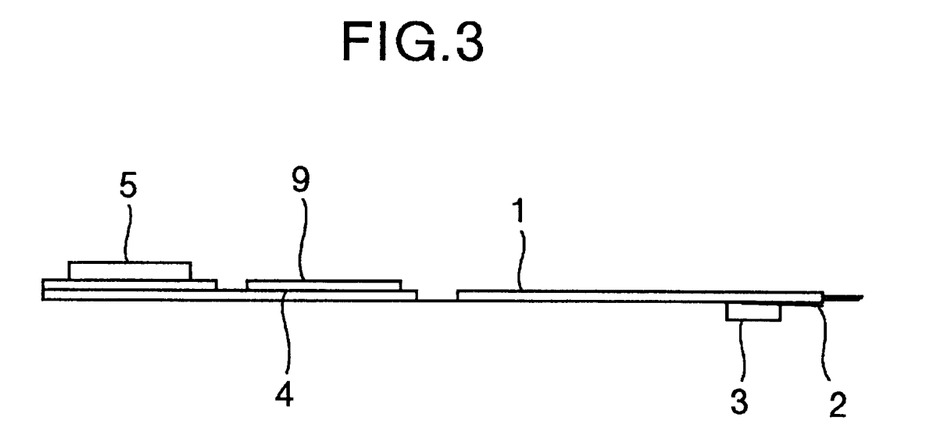
FIG. 3 is a side view of the suspension used in the first embodiment.
Figure 4:
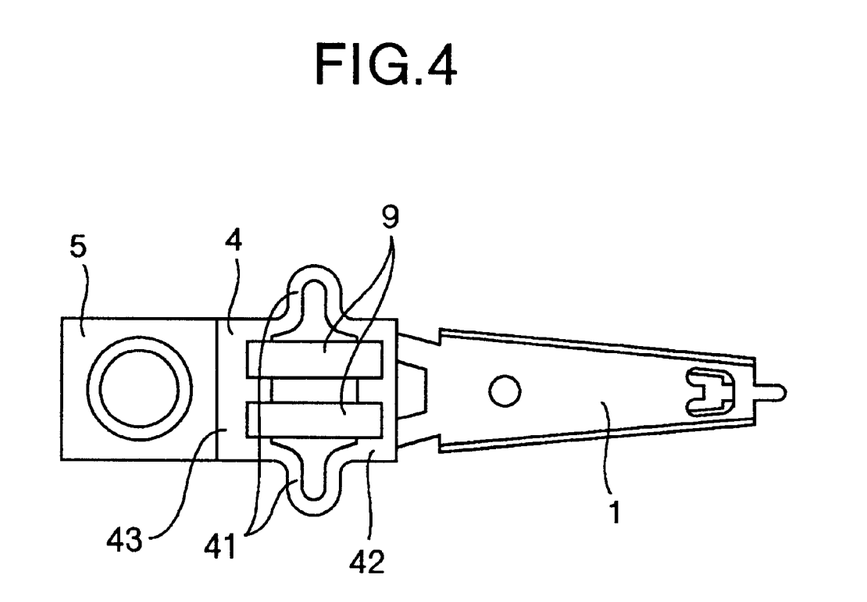
FIG. 4 is a top view of the suspension used in the first embodiment.

FIG. 1 is a perspective view of a magnetic disk unit embodying the invention, FIG. 2 being a perspective view of a suspension used therein, FIG. 3 being a side view of the suspension, and FIG. 4 is a top view of the suspension.

As shown in FIGS. 1 to 4, a slider 3 is attached to the end portion of a load beam 1 through a flexure 2, a magnetic head 22 being mounted on the slider 3. At the side of the slider 3 attached to the load beam 1 is mounted an IC 20 for amplifying the reading/writing signals of the magnetic head 22 (which IC is below referred to as "IC for the magnetic head"). In the IC for the magnetic head are provided temperature-detecting means (sensor). The temperature-detecting means comprise a sensor detecting a temperature by use of variation of the resistance value of a semiconductor diode which variation occurs during the temperature variation of the semiconductor diode. Alternatively, the temperature sensor may comprise, instead of the semiconductor diode, a thermocouple etc. adhering onto the surface of the IC.

The load beam 1 is secured to micro actuator-mounting portion 4 by welding etc, and the micro actuator-mounting portion 4 being secured to a mount 5 by welding etc., which mount is secured to a carriage 6 by caulking etc. By the rotative movement of the carriage 6 about a pivot 7, it is possible for the magnetic head to access an arbitrary radial position on the disk 8. On the micro actuator-mounting portion 4 is also mounted micro actuators 9 comprising piezoelectric elements. In FIG. 2, hatched portions are locations onto which the micro actuators 9 are secured. The portions to which the micro actuators 9 is secured may be worked to be lower than the surrounding plane thereof by etching, so that the micro actuators can be readily attached.

The micro actuator-mounting portion 4 comprises arm portions 41, a micro actuator-securing portion 42 located at the side of the magnetic head, and another micro actuator-securing portion 43 located at the side of the carriage, all of which are formed integrally with each other. Each of the arm portions 41 is located outside from the longitudinal axis of the load beam 1 so that the arm portions 41 may not be in contact or sliding relation to the micro actuators 9, and each of the arm portions has an outward extending, convex shape so that it may become flexible in such a degree as not to impede the operation of the micro actuators 9.

Figure 5:
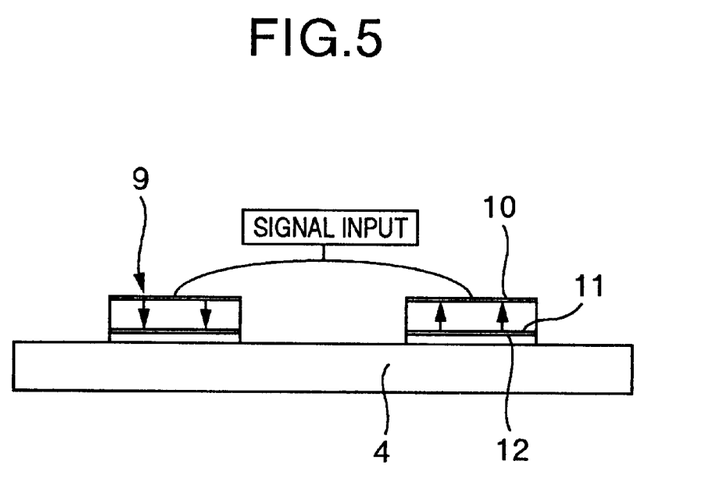
FIG. 5 is a sectional view of micro actuators and micro actuators-mounting portion relating to the first embodiment.
Figure 6:
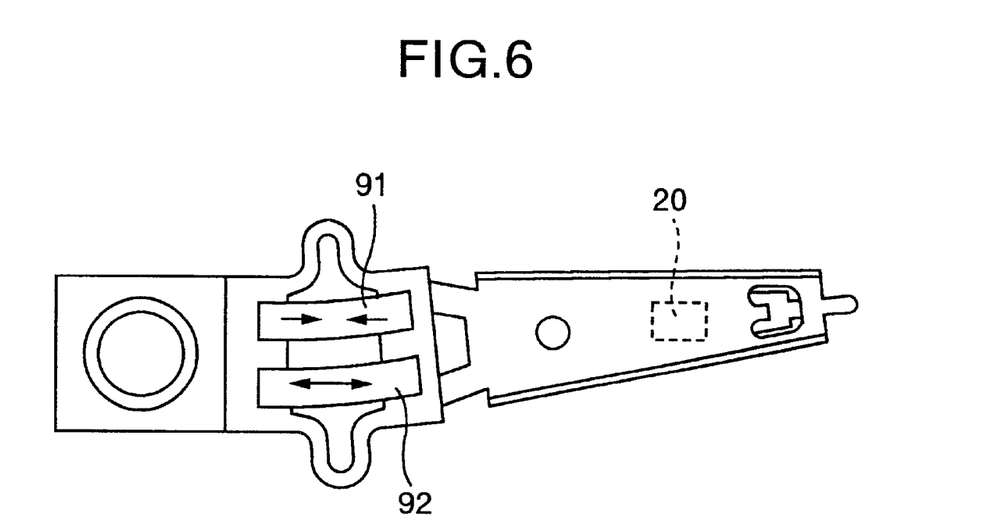
FIG. 6 is a drawing showing the warp of the suspension occurring by the operation of the micro actuators used in the first embodiment.

FIG. 5 is a sectional view of the micro actuators 9 and the micro actuator-mounting portion 4, in which drawing the marks of arrows show the direction of polarization of the micro actuators 9 comprising the piezoelectric elements. In each of the micro actuators 9, there are provided an upper electrode 10 and a lower electrode 11, which is secured to the micro actuator-mounting portion 4 through adhesive 12 having electric conduction. The electric potential of the micro actuators-mounting portion 4 becomes zero through the mount 5 and the carriage 6. Thus, in a state where a signal is input into the upper electrodes 10 as shown in FIG. 5, the expanding or contracting of each of the two micro actuators 9 occurs in opposite directions because the directions of the polarization of the two micro actuators 9 are opposite to each other. As the result, as shown in FIG. 6, the micro actuator 91 is warped to contract in the longitudinal direction, and the micro actuator 92 is warped to expand in the longitudinal direction, so that there occurs, as the whole of the suspension, the warp shown in FIG. 6, whereby it becomes possible to slightly move the slider 3 in the direction of the radius of the disk.

Figure 10:
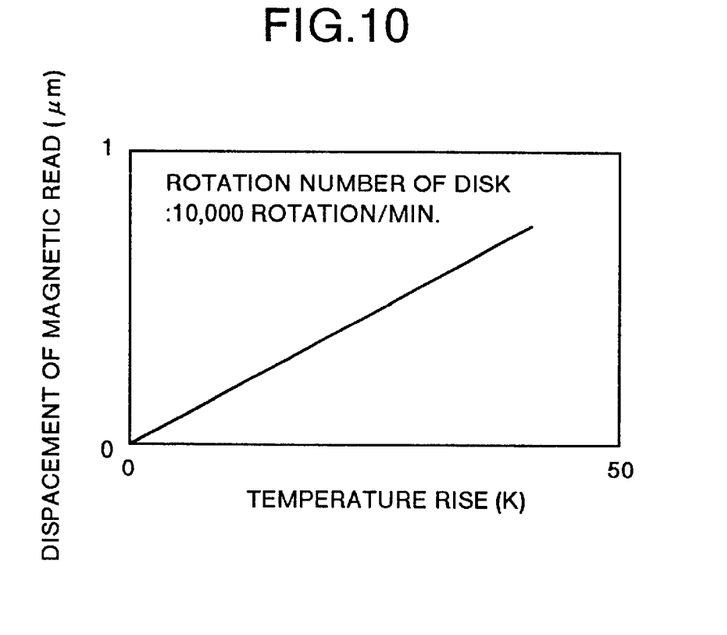
FIG. 10 is a graph showing a relation between the temperature rise of the IC and the displacement of the magnetic head.

In FIG. 10, there is shown a relation between the temperature rise and the displacement of the magnetic head both of which were obtained by experiments. In the experiments, there were used a single sheet of 3.5 type and an IC for thermal evaluation (which is below referred to as TEG) which comprises a heating element capable of controlling the amount of heating and a temperature sensor utilizing resistance variation caused by the temperature variation of a diode. The experiments were performed by using a suspension in which this TEG is mounted on the load beam. The radial displacement of the magnetic head was measured by use of a laser displacement gauge. From FIG. 10, it is found that the magnetic head moves in the radial direction by the temperature rise thereof. Specifically, by the temperature rise of 40° K., the displacement of about 0.8 $\mu$m occurs. Further, the temperature rise and the displacement are in a proportional relation to each other. Thus, the higher the temperature rise, the larger the displacement becomes.

Figure 11A:
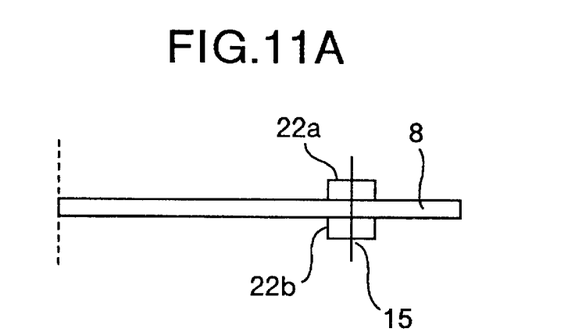
FIGS. 11A and 11B are drawings showing a problem caused by the occurrence of thermal displacement of the magnetic head.
Figure 11B:
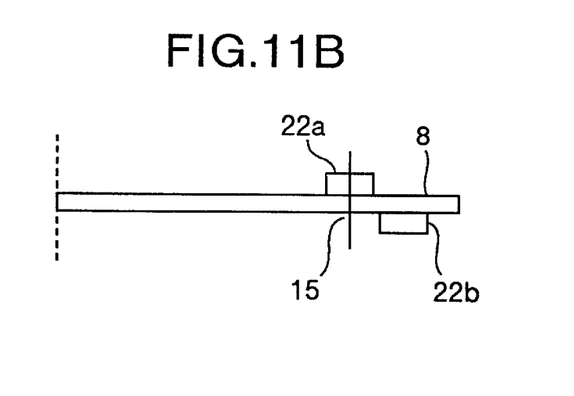

FIGS. 11A and 11B show a problem caused in a case where, in a magnetic disk unit having a plurality of magnetic heads, a certain one of the plurality of magnetic heads located in the same cylinder performs successively reading or writing. In FIGS. 11A and 11B, two magnetic heads are taken into consideration, and one magnetic head 22a is deemed to be successively operated for reading/writing. Prior to the operation of the magnetic head, two of the magnetic heads 22a and 22b are located on the same cylinder 15. Then, in a case where the magnetic head 22a is successively operated, the temperature of the IC in the magnetic head rises, so that the thermal warp of the suspension occurs with the successively operated magnetic head 22a being radially deviated from the location of the other magnetic head (non-operated magnetic head 22b), as shown in FIG. 11b. Since the magnetic head 22a is position-controlled, it follow the same cylinder 15. In this state, when head switching from the successively operated magnetic head 22a to the other magnetic head 22b is required by a personal computer because of the change of data, the magnetic head 22b commencing the operation by the head switching comes to lose its position because it is located at a radial position different from that of the cylinder of the magnetic head 22a. Thus, it is necessary for the magnetic head 22b to seek in the radial direction so that it may get positioning information recorded on the disk face. As the result thereof, the transfer speed of data decreases because instantaneous writing/reading of the data can not be performed. The invention is achieved for solving the problem, and the method of the compensation thereof is explained below while referring to FIGS. 7A to 7C.

Figure 7A:
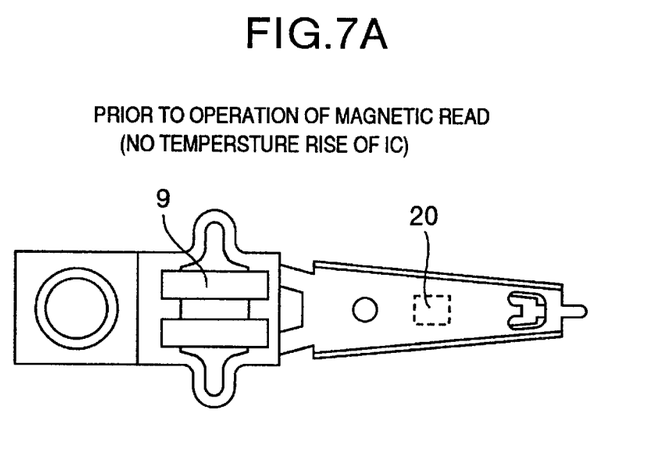
FIGS. 7A to 7C are drawings for explaining the compensating mechanism of the thermal displacement of the magnetic head used in the invention.
Figure 7B:
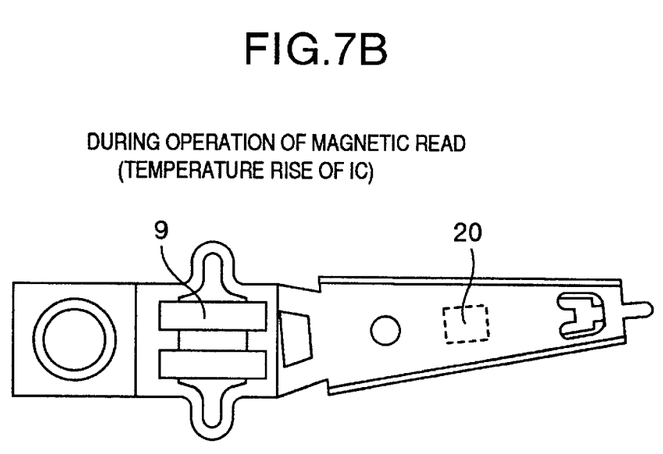
Figure 7C:
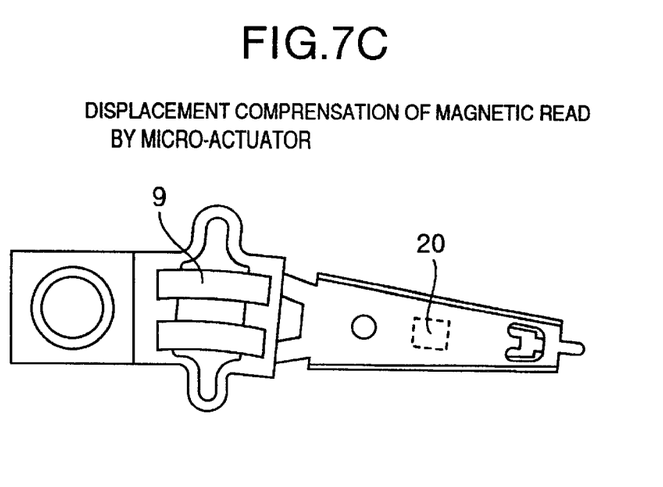

FIG. 7A shows a state of the magnetic head prior to the operation thereof, that is, a state of no heating of the IC (no temperature rise). In a case where the magnetic head performs the successive reading or writing of data, heat occurs in the IC, so that the displacement of the magnetic head occurs in the radial direction as shown in FIG. 7B. According to the experiment of the inventors, the displacement of the magnetic head occurs toward the side of the inner periphery of the magnetic disk due to the temperature rise of the IC. Although the magnetic head located on the rear face of the load beam is not shown in the drawings, the displacement of the magnetic head is deemed to occur due to the load beam warp caused as shown in the drawings. In the case where the displacement of the magnetic head occurs toward the inner periphery of the disk due to the heat caused in the IC, the micro actuators are driven in the direction opposite to the displacement direction as shown in FIG. 7C, whereby the magnetic head can be positioned at the location defined prior to the occurrence of the thermal displacement.

Thus, even in a case where, just after the finish of successive reading or writing, there occurs head-switching to a magnetic head halting till this finish, no position deviation such as one explained in relation to FIGS. 11A and 11B occurs between both of the magnetic heads. Thus, even at a time when a magnetic head in which heat occurs from the IC is switched to another halting magnetic head (in which no heat occurs from the IC), there occurs no situation in which the switched magnetic head can not find its cylinder position (, that is, its track position). Accordingly, it becomes unnecessary to perform such operation as the switched magnetic head which can not find its positioning information due to the thermal displacement seeks to read out the servo information. Since in this case a period of time corresponding to the time of the seeking and the waiting time followed by the seeking can be shortened, it becomes possible to realize data access of high speed.

Figure 8:
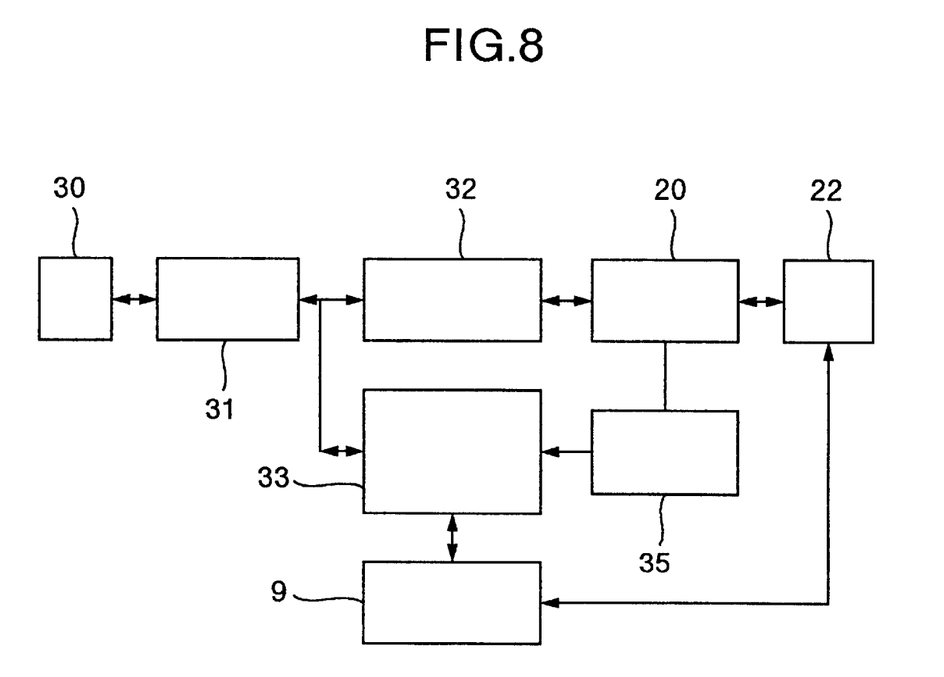
FIG. 8 is a drawing for showing the conception of a compensating mechanism of the thermal displacement of the magnetic head used in the invention.

FIG. 8 shows a block diagram for compensating the position deviation caused due to the temperature variation by the heat generated from the IC. The magnetic disk unit and the personal computer (PC) 30 perform the transferring/receiving of data through a HDD controller 31. The HDD controller 31 transfers data to a reading/writing controller 32 when writing the data, the signal of the data being amplified at the IC 20 for the magnetic head, and the data are recorded on the disk by the magnetic head 22. At the time of reading out data, steps reverse to those of the writing are performed, that is, the data is read out from the magnetic disk, and the data are transferred to the PC 30 through the HDD controller 31. In a case where the thermal displacement of the magnetic head occurs due to heat generated from the IC 20 for the magnetic head, the controller 33 for the micro actuators 9 drives, in compliance with temperature information transferred from a temperature sensor 35 attached to the IC 20, the micro actuators 9 so that the displacement of the magnetic head 2 may occur in the direction reverse to the direction of the above thermal displacement, whereby the thermal displacement of the magnetic head 2 is compensated.

Accordingly, even in the case of the temperature rise caused by the heat occurring from the IC, there occurs no position deviation between the operated magnetic head and the halting magnetic head. Thus, it becomes unnecessary for the halting magnetic head to perform the seeking operation for detecting the servo information because no position deviation occurs between them even at a time when the magnetic head switching occurs between both of these magnetic heads. Further, by storing in the IC a relation between the temperature rise of the IC and the amount of the displacement (the amount of the compensation) of the magnetic head, it is also possible to perform the compensation while the controller for the micro actuators takes the amount of the compensation into account, whereby there is obtained such an advantage as to make it unnecessary to store in the PC or the HDD controller the relation between the temperature rise and the amount of the compensation.

Further, at the time of the STW, since writing can be performed on a track at an even pitch, it becomes possible to improve the quality of positioning signals (servo signals), whereby it is possible to achieve the increase in track density and to improve reliability at the time of the reading/writing of data.

Figure 9:
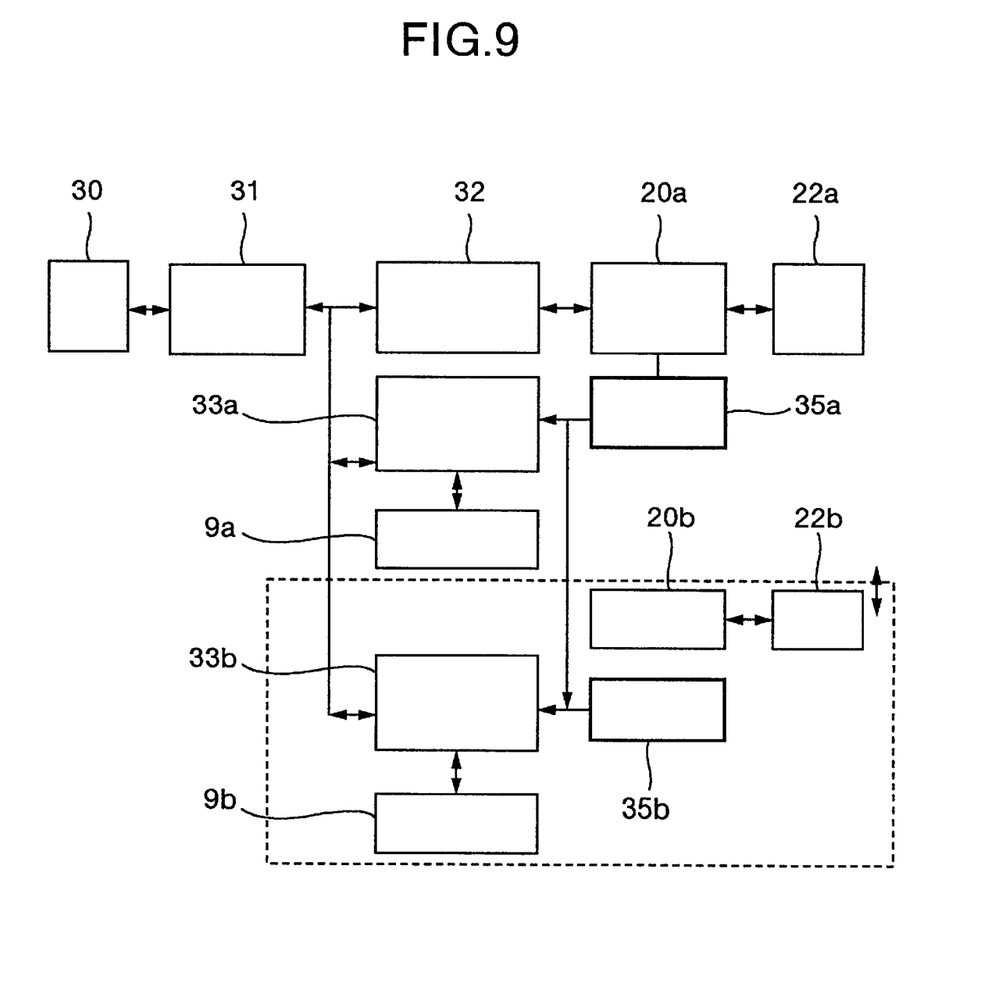
FIG. 9 is a drawing for showing the conception of another compensating mechanism of the thermal displacement of the magnetic head used in the invention.

FIG. 9 shows another method for compensating the thermal displacement of the magnetic head. The above described compensation shown in FIG. 8 is the method for moving the magnetic head 22, in which the displacement had occurred due to the generation of heat of the IC 20, in a direction reverse to the direction of this displacement by use of the micro actuators 9 so that the displacement may become substantially zero. On the other hand, the compensation shown in FIG. 9 is the method for imparting to the halting magnetic head 22b (in which no heat generation of the IC occurs) the same amount of displacement as the amount of the displacement of the magnetic head 22a caused by the generation of heat of IC 20a so that the magnetic head 22b with no heat generation may follow the amount of the displacement of the magnetic head 22a which displacement is caused by the generation of the heat. Specifically, in FIG. 9, there are provided two of the magnetic heads 22a and 22b and actuators 9a and 9b for actuating the magnetic heads 22a and 22b, respectively, which magnetic heads and actuators are distinguished from each other by appended letters "a" and "b". Namely, regarding the magnetic heads, the appended letter "a" shows one which has been operated, and the appended letter "b" shows one which is to be operated. Here, differing from the method of FIG. 8, the compensation method of FIG. 9 comprises steps of: inputting the measurement result of an IC temperature sensor 35a, which is provided in an IC 20a for a magnetic head 22a, to a controller 33b for micro actuators 9b of a magnetic head 22b; and moving the magnetic head 22b through the micro actuators 9b in accordance with the temperature difference (, i.e., the temperature difference between the IC 20a for the magnetic head 22a and an IC 20b for the magnetic head 20b) brought about from the temperature sensor 35b in the IC 20b for the magnetic head 22b so that the magnetic head 22b may follow the magnetic head 22a. By this method, it is possible to obtain a result similar to the method of FIG. 8, that is, it is possible for the magnetic heads 22a and 22b to have no position deviation caused due to the generation of heat from the IC 20a. In the method of FIG. 8, it is necessary to successively drive the micro actuators 20 in correspondence to the temperature rise occurring during the reading/ writing. Namely, since the temperature rises during the reading/writing, the micro actuators 20 are necessary to be successively driven in compliance with the temperature rise. However, no thermal displacement occurs in appearance regarding the magnetic heads, and this method is proper in such a case of writing tracks at a constant pitch as in the STW.

On the other hand, in the method of FIG. 9, the temperature difference between the ICs 20a and 20b may be measured only at the time of performing the switching from the magnetic head 22a driven just now to the halting magnetic head 22b, and the halting magnetic head 22b is driven by the amount of the thermal displacement so that the thermal displacement may become zero. Thus, it becomes unnecessary to successively drive the micro actuators 20b, so that the controlling thereof becomes easy, the consumption of electric power being decreased, and the service life of the micro actuators can be prolonged. In a case where the relation between the temperature rise and the amount of displacement differs from the above one between magnetic heads to be used, it is necessary to perform individual controlling while taking not only the temperature difference but also the displacement of each of the magnetic heads into account.

Any one of the methods of FIGS. 8 and 9 can be selected in compliance with the intended characteristics of a magnetic disk unit.

Figure 12:
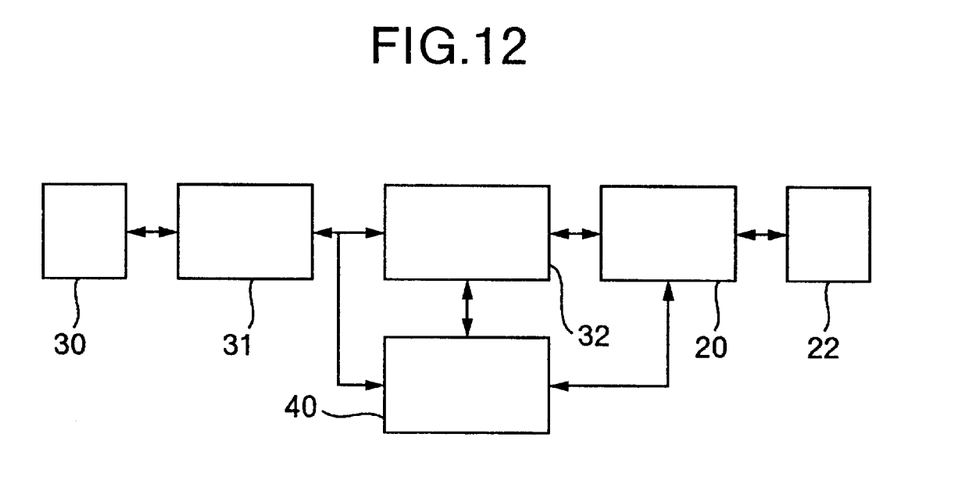
FIG. 12 is a block diagram for preheating the IC prior to STW.
Figure 13:
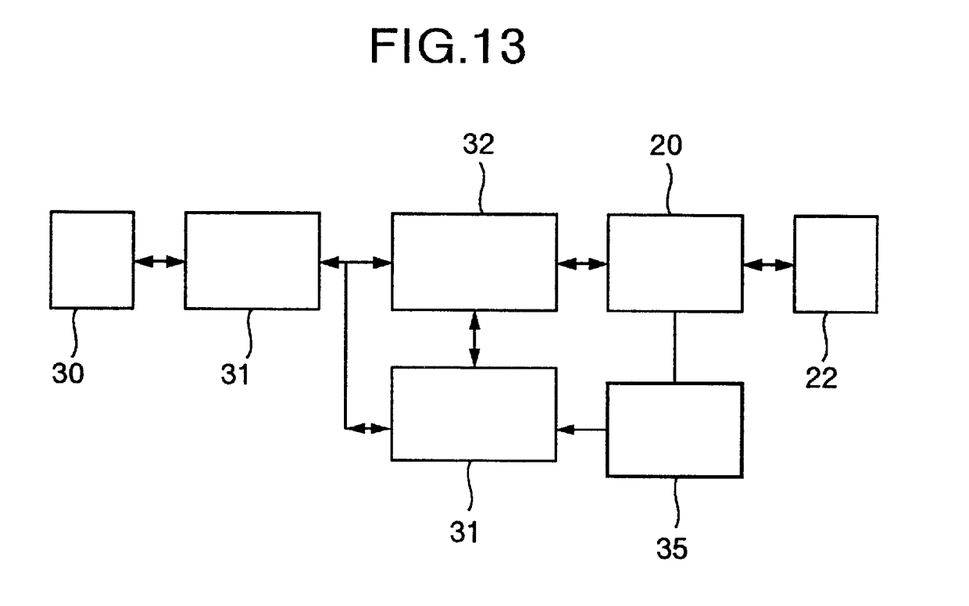
FIG. 13 is another block diagram for controlling the temperature of the IC so that it becomes constant over all peripheries of the disk during the STW.

Then, there is described, while referring to the block diagram of FIG. 12, a preheating method for solving such a problem as servo information can not be written at an even track pitch due to the thermal displacement occurring at the time of the STW. FIG. 12 differs from FIG. 8 in that a controller 40 for preheating the IC 20 is provided instead of the micro actuator controller 33 shown in FIG. 8. In FIG. 12, the same members as those used in the case of FIG. 8 are indicated by the same reference numbers as those in FIG. 8. The preheating controller 40 receives information-writing signals from a R/W controller 32, and heats (preheats) the magnetic head 20 before the magnetic head 22 commences the writing of positioning information in the radial direction of the magnetic disk. The heating of the magnetic head IC 20 is performed by actual dummy-writing on the magnetic disk through the magnetic head 22 while causing the same electric current as that of the writing to flow in the IC 20. The position at which the dummy writing is performed may be one at which actual positioning information is written or may be any position on the magnetic disk. In a case where the dummy writing is performed at positions in which actual positioning information is to be written, the formal servo information may be over-written on the dummy write. A period of time for the preheating may be in the range of several seconds to about ten seconds from the commencement of causing electric current to flow in the IC (, that is, after beginning the heating). This period of time is obtained by experiments. Namely, this period of time is a thermal response time from the commencement of the temperature rise because of the heating to the reaching to the constant thermal displacement occurring after the thermal displacement of the magnetic head occurred and after the temperature became constant. After performing the heating by the predetermined period of time through the preheating controller 40, the writing of the positioning information on the magnetic disk is commenced. In FIG. 13 is shown no controller for moving the magnetic head 22 in the radial direction. By use of the coarse actuators shown in FIG. 1, the magnetic head is moved in the radial direction, and the servo information is then written. This preheating method is one in which the temperature has been previously raised at the commencement of the writing, so that the occurrence of the thermal displacement of the magnetic head due to the temperature rise is prevented.

Next, while referring to FIG. 13, there is below described a method for solving such a problem as no track can be written at an even track pitch at the time of the STW due to the temperature difference between the ICs which difference is caused by difference in air flow rates varying in dependence on the change in the radial position on the disk. FIG. 13 differs from FIG. 12 in that, in FIG. 13, a temperature controller 45 is provided instead of the preheating controller 40 shown in FIG. 12 and in that a temperature sensor 35 is provided which detects the temperature of the IC 20 for the magnetic head. Then, the function of each portion at the time of the STW is described below. The magnetic head 22 is moved from the outer periphery of the magnetic disk toward the inner periphery thereof by positioning means. The R/W head is positioned above the magnetic disk at each radial position and performs the writing of the servo information. The temperature sensor 35 detects the temperature of the magnetic head IC 20 at each radial position, and transfers the signal of the detected temperature to the temperature controller 45. The temperature controller 45 controls the temperature of the IC 20 so that this temperature may become always constant.

In a case where the temperature of the IC 20 is lower than the predetermined temperature, the IC 20 is heated, and after being raised up to the predetermined temperature, signals are transferred from the controller 32 to the magnetic head IC 20 in cooperation with the R/W controller 32, and the servo information is written on the magnetic disk by the magnetic head 22. In another case where the temperature of the IC 20 become higher than the predetermined temperature, writing is paused for some time, and the writing of the servo information is controlled in cooperation with the R/W controller so that the magnetic head 22 may not write the servo information until the IC 20 is cooled down to the predetermined temperature.

As describe above, before the magnetic head 22 performs the writing of the servo information, the temperature of the IC 20 is detected by the temperature sensor 35, and the temperature of the IC 20 is controlled by the temperature controller 45 so that the temperature of the IC 20 may become the predetermined temperature. Then, after confirming that the temperature of the IC 20 has become the predetermined temperature, the positioning information is written by the magnetic head 22. By this method, there occurs no problem that the temperature of the IC 20 varies in dependence on the radial position of the magnetic head with the result that the amount of the thermal displacement of the magnetic head 22 varies. Thus, all over the peripheries of the magnetic disk, the thermal displacement of the magnetic head becomes constant, whereby it is possible to write the servo information at an even track pitch. As the results thereof, the positioning precision is enhanced, the quality of R/W being improved, and a high recording density can become possible.

According to the invention, since the displacement of the magnetic head occurring due to the generation of heat from the IC can be compensated by two stage actuators (micro actuators), it is possible to prevent the rotational delay of the magnetic disk from occurring at the time of the switching of the magnetic heads, whereby there occurs no lowering of the access speed of data. Further, since the positioning ability of the magnetic head can be enhanced, it becomes possible to improve the reliability of the magnetic disk unit at the time of reading/writing.

What is claimed is:

1. A magnetic disk unit comprising:
   magnetic disks on each of which information is recorded;
   magnetic heads each performing reading/writing of information on each of said magnetic disks;
   suspensions each supporting each of said magnetic heads;
   a carriage supporting said suspensions;
   coarse actuators for largely moving each of the magnetic heads through the carriage;
   micro actuators for slightly moving each of the magnetic head;
   an IC for amplifying reading/writing signals of each of the magnetic head which IC is mounted on each of said suspensions;
   a sensor for detecting a temperature of said IC during the reading or writing of information performed by one of the magnetic heads; and
   controlling means for driving and controlling said micro actuators in accordance with values detected by said sensor.

2. A magnetic disk unit according to claim 1, wherein a previously obtained relation of table form between the temperature of the IC and the amount of the warp of each of the magnetic heads is stored in the controlling means, and the controlling of said micro actuators is performed by use of a value obtained from said relation of table type which value corresponds to said temperature detected by said sensor.

3. A magnetic disk unit according to claim 1, wherein a period of time in which said controlling means drive said micro actuators in accordance with said temperature of the IC to thereby perform compensation of position of each of said magnetic heads is from commencement of reading/writing by said magnetic head and to finish of said reading/writing.

4. A magnetic disk unit according to claim 1, wherein said temperature sensor performs the detecting of said temperature of said IC by using variation of resistance value of a semiconductor diode provided in said IC which resistance variation occurs due to temperature variation of said semiconductor diode.

5. A magnetic disk unit according to claim 1, further comprising another temperature sensor detecting a temperature of atmosphere surrounding said IC, said micro actuators for precisely positioning each of the magnetic heads being controlled by use of difference between the temperature of said IC and the temperature of the surrounding atmosphere.

6. A magnetic disk unit comprising:
   magnetic disks on each of which information is recorded;
   magnetic heads each performing reading/writing of information on each of said magnetic disks;
   suspensions each supporting each of said magnetic heads;
   a carriage supporting said suspensions;
   coarse actuators for largely moving each of the magnetic head through the carriage;
   micro actuators for slightly moving each of the magnetic heads;
   an IC for amplifying reading/writing signals of the magnetic head which IC is mounted on each of said suspensions;
   a sensor for detecting a temperature of said IC during the reading or writing of information performed by one of the magnetic heads; and
   controlling means for driving said micro actuators to thereby compensate position of said magnetic head in accordance with values detected by said sensor in a period that said magnetic head is halting reading/writing.

7. A magnetic disk unit according to claim 6, further comprising another temperature sensor detecting a temperature of atmosphere surrounding said IC, said micro actuators for precisely positioning each of the magnetic heads being controlled by use of difference between the temperature of said IC and the temperature of the surrounding atmosphere.

8. A magnetic disk unit comprising:
   magnetic disks on each of which information is recorded;
   magnetic heads each performing reading/writing of information on each of said magnetic disks;
   suspensions each supporting each of said magnetic heads;
   a carriage supporting said suspensions;
   coarse actuators for largely moving each of the magnetic heads through the carriage;
   micro actuators for slightly moving each of the magnetic heads;
   an IC for amplifying reading/writing signals of each of the magnetic heads which IC is mounted on said suspension; and
   a sensor for detecting a temperature of said IC during the reading or writing of information performed by one of the magnetic heads, a relation between the temperature of said IC and a deviation of position of said magnetic head being stored in said IC.

9. A magnetic disk unit according to claim 8, further comprising another temperature sensor detecting a temperature of atmosphere surrounding said IC, said micro actuators for precisely positioning each of the magnetic heads being controlled by use of difference between the temperature of said IC and the temperature of the surrounding atmosphere.

10. A magnetic disk unit comprising:
    magnetic disks on each of which information is recorded;
    magnetic heads each performing reading/writing of information on each of said magnetic disks;
    suspensions each supporting each of said magnetic heads;
    a carriage supporting said suspensions;
    coarse actuators for largely moving each of the magnetic heads through the carriage;
    micro actuators for slightly moving each of the magnetic heads;
    an IC for amplifying reading/writing signals of each of the magnetic heads which IC is mounted on each of said suspensions;
    a sensor for detecting a temperature of said IC;
    heating means for heating said IC; and
    reading or writing controlling means for performing the reading/wiring of the information after said IC temperature detected by said sensor has become a predetermined temperature.

11. A magnetic disk unit comprising:
    magnetic disks on each of which information is recorded;
    magnetic heads each performing reading/writing of information on each of said magnetic disks;
    suspensions each supporting each of said magnetic heads;
    a carriage supporting said suspensions;
    coarse actuators for largely moving each of the magnetic heads through the carriage;
    micro actuators for slightly moving each of the magnetic heads;
    an IC for amplifying reading/writing signals of each of the magnetic heads which IC is mounted on each of said suspensions;

a sensor for detecting a temperature of said IC;

heating means for heating said IC; and

IC-temperature controlling means for heating the temperature of said IC during operation of said magnetic disk unit so that said IC temperature detected by said sensor is kept to be a predetermined temperature.

12. A magnetic disk unit according to claim 11, wherein a period of time in which said heating is performed by said heating-controlling means is in a range from several seconds to about 10 seconds.

13. A magnetic disk unit comprising:

magnetic disks on each of which information is recorded;

magnetic heads each performing reading/writing of information on said magnetic disk;

suspension each supporting each of said magnetic heads;

a carriage supporting said suspensions;

coarse actuators for largely moving each of the magnetic heads through the carriage;

micro actuators for slightly moving each of the magnetic heads;

an IC for amplifying reading/writing signals of each of the magnetic heads which IC is mounted on each of said suspensions;

a sensor for detecting a temperature of said IC;

heating mean for generating heat by consuming the same power as that consumed at the time of the reading/writing; and heating-controlling means for heating said IC for a predetermined period of time by the same amount of heat as the amount of said heat generated during said reading/writing.

* * * * *